(12) United States Patent
Watanabe

(10) Patent No.: US 10,634,223 B2
(45) Date of Patent: Apr. 28, 2020

(54) TENSIONER

(71) Applicant: TSUBAKIMOTO CHAIN CO., Osaka-shi, Osaka (JP)

(72) Inventor: Masanori Watanabe, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 225 days.

(21) Appl. No.: 15/683,971

(22) Filed: Aug. 23, 2017

(65) Prior Publication Data

US 2018/0128354 A1    May 10, 2018

(30) Foreign Application Priority Data

Sep. 7, 2016    (JP) .................................. 2016-174483

(51) Int. Cl.
| | | |
|---|---|---|
| *F16H 7/08* | (2006.01) | |
| *F16K 15/04* | (2006.01) | |
| *F16H 9/26* | (2006.01) | |
| *F15B 13/02* | (2006.01) | |

(52) U.S. Cl.
CPC ......... *F16H 7/0848* (2013.01); *F15B 13/027* (2013.01); *F16H 7/08* (2013.01); *F16H 9/26* (2013.01); *F16K 15/042* (2013.01); *F16K 15/044* (2013.01); *F16H 2007/0812* (2013.01); *F16H 2007/0859* (2013.01); *F16H 2007/0872* (2013.01)

(58) Field of Classification Search
CPC .. F16H 7/08; F16H 7/0848; F16H 2007/0859; F16H 2007/0812; F16H 2007/0872; F16H 2007/0878; F16K 15/042; F15B 13/027
See application file for complete search history.

(56) References Cited

U.S. PATENT DOCUMENTS

| | | | | |
|---|---|---|---|---|
| 2,308,876 | A * | 1/1943 | Hammett | F16K 15/042 137/512.1 |
| 9,188,203 | B2 * | 11/2015 | Crump | F16H 7/0848 |
| 2008/0318717 | A1 | 12/2008 | Kurematsu | |
| 2009/0197721 | A1 | 8/2009 | Emizu et al. | |
| 2013/0331214 | A1 * | 12/2013 | Crump | F16H 7/0848 474/110 |
| 2016/0230612 | A1 * | 8/2016 | Schulze | F01L 1/3442 |

(Continued)

FOREIGN PATENT DOCUMENTS

| | | |
|---|---|---|
| JP | 2005-042769 A | 2/2005 |
| JP | 2009-2495 A | 1/2009 |

(Continued)

*Primary Examiner* — Michael R Mansen
*Assistant Examiner* — Juan J Campos, Jr.
(74) *Attorney, Agent, or Firm* — Westerman, Hattori, Daniels & Adrian, LLP

(57) ABSTRACT

An object of the present invention is to provide a simple-structured tensioner capable of consistently exhibiting the check valve function irrespective of the form of oil supply passages. The tensioner includes a plunger, a housing, a biasing unit, an oil supply passage, and a check valve. The check valve includes a plurality of valve members and a ball seat member. The ball seat member includes a plurality of oil passages and a plurality of seat parts. The check valve further includes a passage forming member having an oil inlet disposed between the plurality of oil passages and the oil supply passage.

7 Claims, 10 Drawing Sheets

(56) References Cited

U.S. PATENT DOCUMENTS

2016/0356365 A1* 12/2016 Crump ................. F16H 7/0848
2017/0023140 A1    1/2017 Crump
2017/0175913 A1*  6/2017 Klaphake ................ F04B 49/22

FOREIGN PATENT DOCUMENTS

JP    5080299 B2    11/2012
JP    2014-506985 A    3/2014
KR    10-2016-0093640 A    8/2016

* cited by examiner

Related Art

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension in a chain or the like. For example, a known chain guide mechanism, which slidably guides a drive chain, such as an endless roller chain passing over respective sprockets of a crankshaft and of a cam shaft inside an engine room, uses a tensioner to bias a tensioner lever in order to maintain appropriate tension of the drive chain or the like (see, for example, Japanese Patent Application Laid-open No. 2009-002495).

The known tensioner 510 used in such a chain guide mechanism includes, for example, as shown schematically in FIG. 10, a housing 530 having a cylindrical plunger bore 531 that is open on a front side, a cylindrical plunger 520 slidably inserted in the plunger bore 531, and a biasing unit 540 that biases the plunger 520 toward the front side.

Oil is supplied from a housing hole 533 formed in the housing 530, so that an oil pressure chamber 511 formed between the plunger bore 531 and the plunger 520 is filled with the oil, which oil biases the plunger 520 toward the front side. A check valve 550 (schematically shown as a valve member) stops the oil from flowing out from the housing hole 533. As the plunger 520 reciprocates, oil flows through the small gap between the plunger 520 and the plunger bore 531, and the flow resistance provides the damping effect of slowing down the reciprocal movement of the plunger 520.

Such a tensioner 510 requires a sufficient amount of oil supplied to the oil pressure chamber 511 because favorable tension cannot be given to the drive chain if the pressure in the oil pressure chamber 511 decreases. The problem, however, was that the amount of oil supplied to the oil pressure chamber 511 was not sufficient in, for example, the low rpm range of the engine, because the hydraulic pressure of the oil pump for supplying oil to the tensioner is lowered. One possible method for solving this problem would be to design the tensioner to have a large open/close stroke of the valve member 550 to increase the amount of oil supplied to the oil pressure chamber 511.

If the stroke of the valve member 550 is increased, the amount of supplied oil when the valve member 550 is opened will increase. On the other hand, it takes more time for the valve member 550 to close, so that the response speed of the valve member 550 will decrease.

As one method of solving the problem described above, it has been proposed to provide, inside one check valve, a plurality of oil passages each having a valve member (see Japanese Translation of PCT Application No. 2014-506985). With a plurality of oil passages each having a valve member as in the tensioner described in Japanese Translation of PCT Application No. 2014-506985, the amount of oil to be secured through each oil passage can be reduced, so that a sufficient amount of oil can be supplied without having to design each valve member to have a larger stroke, and also an increase in time until the valve members close can be avoided.

SUMMARY OF THE INVENTION

In such a tensioner, oil supplied from an oil pump is fed to the check valve through an oil supply passage that is configured by a housing hole and the like in the housing. The concrete design of this oil supply passage is to be defined in accordance with the installation environment of the tensioner inside the engine room.

Depending on the shape of the oil supply passage, such as that, for example, of the tensioner described in Japanese Translation of PCT Application No. 2014-506985 wherein the oil supply passage is largely bent before the check valve, the pressure distribution of the oil flowing through the oil supply passage can be uneven and the oil may not be supplied uniformly to the plurality of oil passages inside the check valve. Consequently, the check valve function could not be consistently exhibited, when, for example, some valve members opened while the other valve members remained closed.

The present invention solves these problems and it is an object of the invention to provide a simple-structured tensioner capable of consistently exhibiting the check valve function irrespective of the form of oil supply passages.

The present invention provides a tensioner including: a plunger having a plunger hole that is open on a rear side; a housing having a plunger bore that is open on a front side and accommodates the plunger; a biasing unit that is accommodated inside an oil pressure chamber formed between the plunger bore and a rear end of the plunger such as to be able to freely expand and contract and that biases the plunger toward the front side; an oil supply passage for supplying oil from outside the housing into the oil pressure chamber; and a check valve that allows oil to flow from the oil supply passage into the oil pressure chamber and prevents the oil from flowing out from the oil pressure chamber to the oil supply passage. The check valve includes a plurality of valve members and a ball seat member. The ball seat member includes a plurality of oil passages each having an inlet open toward the oil supply passage and an outlet open toward the oil pressure chamber, and a plurality of seat parts allowing the respective valve members to sit thereon at the respective outlets of the oil passages. The oil passages and the seat parts are provided in the same number as the number of the valve members. The check valve further includes a passage forming member having an oil inlet disposed between the plurality of oil passages and the oil supply passage. The problem described above is thereby solved.

According to one aspect of the present invention, the ball seat member includes a plurality of oil passages each having an inlet open toward the oil supply passage and an outlet open toward the oil pressure chamber, and a plurality of seat parts allowing the respective valve members to sit thereon at the respective outlets of the oil passages. Thereby, even when the hydraulic pressure of the supplied oil is low, a sufficient amount of oil can be secured without designing the valve members to have a large stroke, so that the response speed of the valve members when they close is maintained, as well as a sufficient amount of oil can be supplied to the oil pressure chamber. In addition, the following effects can be achieved:

Namely, as the check valve further includes a passage forming member having an oil inlet disposed between the plurality of oil passages and the oil supply passage, the flow of oil can be controlled by the passage forming member irrespective of the design of the oil supply passage, and thereby unevenness in the oil pressure distribution can be reduced. Thus, oil can be supplied uniformly to all the valve members to open them all when supplying oil to the oil pressure chamber, so that the check valve function can be exhibited in a consistent manner.

Any design change in the oil supply passage can be dealt with by changing the structure of the passage forming member, so that the components of the tensioner can have better versatility.

According to another aspect of the present invention, the passage forming member has a distribution space for distributing oil flowing in from the oil inlet to the plurality of oil passages, the distribution space being formed adjacent to the oil inlet on the oil pressure chamber side. The oil inlet has an inner diameter smaller than an inner diameter of the distribution space. Therefore, the oil flowing in from the oil inlet can be distributed to each of the oil passages evenly.

According to another aspect of the present invention, a connecting part for connecting the plurality of valve members is provided between the plurality of valve members. The operation of the plurality of valve members can be synchronized so that the plurality of valve members open and close simultaneously, whereby oil can be supplied to the oil pressure chamber consistently and the pressure in the oil pressure chamber can be maintained.

According to another aspect of the present invention, an installation recess in which the passage forming member is installed is formed in a side face of the ball seat member that faces the oil supply passage. This way, for example, misalignment between the ball seat member and the passage forming member that may result from the pressure of oil supplied through the oil supply passage can be reliably prevented, and thus performance deterioration of the check valve can be prevented with a simple structure. Since the valve members and the passage forming member can be assembled to the ball seat member so that the check valve is configured in one piece, the check valve can be handled as a single unit when assembling the tensioner and thus the assembling work can be carried out easily. Misalignment of the passage forming member and others can be prevented irrespective of the strength with which the passage forming member fits in the installation recess, so that the machining precision requirements for the passage forming member and installation recess can be kept low.

According to another aspect of the present invention, the passage forming member is formed to accommodate the ball seat member such as to be movable in a front to back direction. The check valve includes a seat biasing unit that biases the ball seat member toward the oil pressure chamber, and a relief passage. The relief passage is formed such as to connect the oil pressure chamber and the oil supply passage when the ball seat member moves toward the oil supply passage, and to be closed when the ball seat member moves toward the oil pressure chamber. Without providing an additional relief valve, the oil in the oil pressure chamber can be released to the oil supply passage through the relief passage to relieve the oil pressure in the oil pressure chamber when an excessively high load is applied to the tensioner and the pressure in the oil pressure chamber is increased. Moreover, the passage forming member serves the function of a casing that accommodates the ball seat member such as to be movable in the front to back direction, so that a further reduction in the number of components can be achieved.

According to another aspect of the present invention, the ball seat member is fixed to the housing or to the plunger, and a retainer installation recess in which the retainer is installed is formed in a side face of the ball seat member that faces the oil pressure chamber. Therefore, even when an excessively high load is applied to the tensioner and the pressure in the oil pressure chamber is increased, for example, misalignment of the ball seat member and retainer that may result from a buildup of pressure can be prevented reliably. Thus performance deterioration of the check valve can be prevented with a simple structure. Since the retainer installation recess is formed in the ball seat member, the valve members and the retainer can be assembled to the ball seat member so that the check valve is configured in one piece, the check valve can be handled as a single unit when assembling the tensioner and the assembling work can be carried out easily. Misalignment of the retainer or the like that may result from a buildup of pressure in the oil pressure chamber as mentioned above can be prevented irrespective of the strength with which the retainer fits in the retainer installation recess, so that the machining precision requirements for the retainer and retainer installation recess can be kept low.

DESCRIPTION OF THE PREFERRED EMBODIMENTS

A tensioner 10 according to a first embodiment of the present invention will be described with reference to the drawings.

Figure 1:
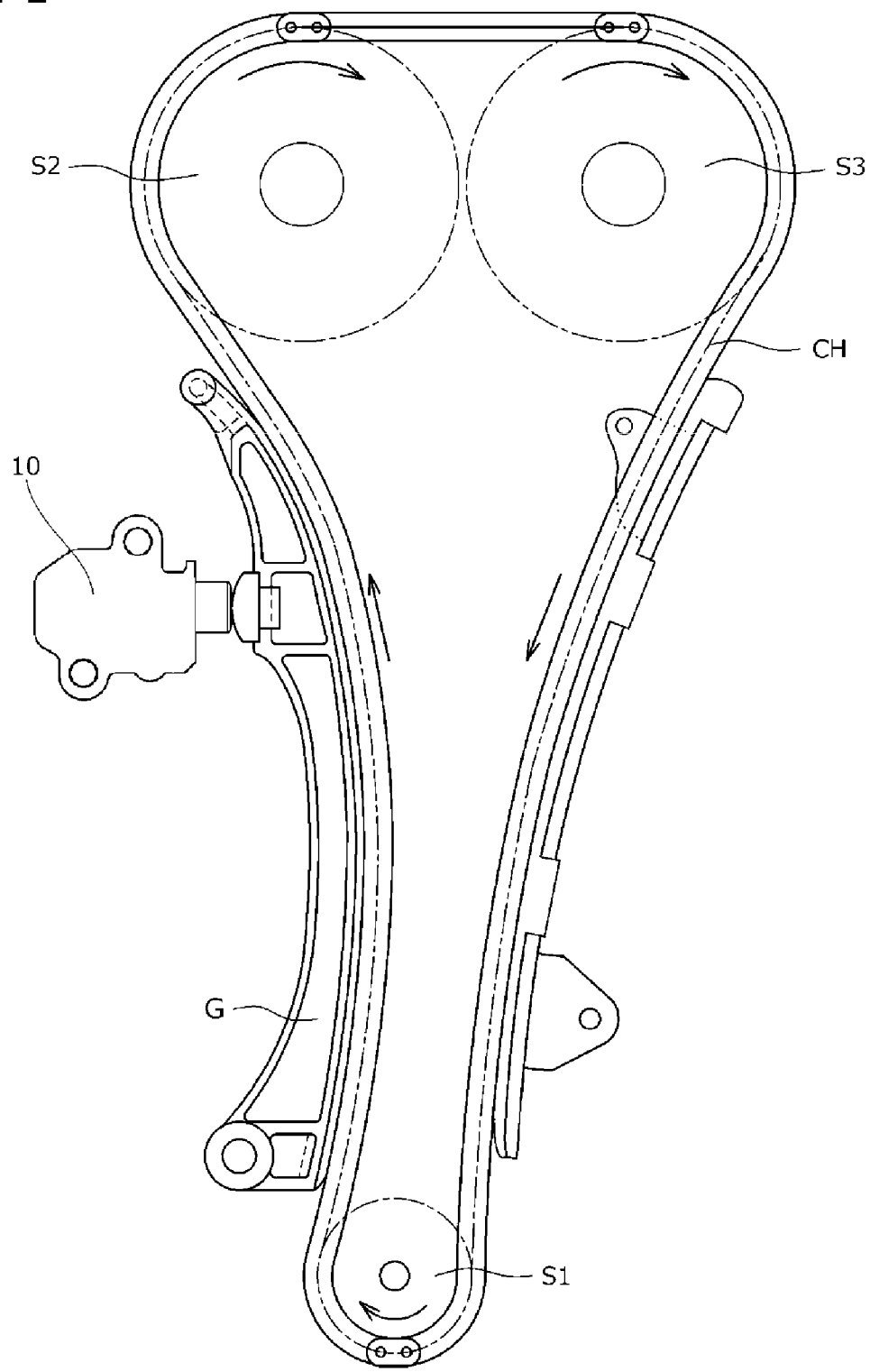
FIG. 1 is an illustrative diagram showing a timing system in which a tensioner according to a first embodiment of the present invention is incorporated.

First, the tensioner 10 of this embodiment is incorporated in a chain drive device used in a timing system or the like of a car engine. As shown in FIG. 1, the tensioner is attached to an engine block (not shown) to apply appropriate tension to the slack side of a drive chain CH passing over a plurality of sprockets S1 to S3 via a tensioner lever G to reduce vibration during the drive.

Figure 2:
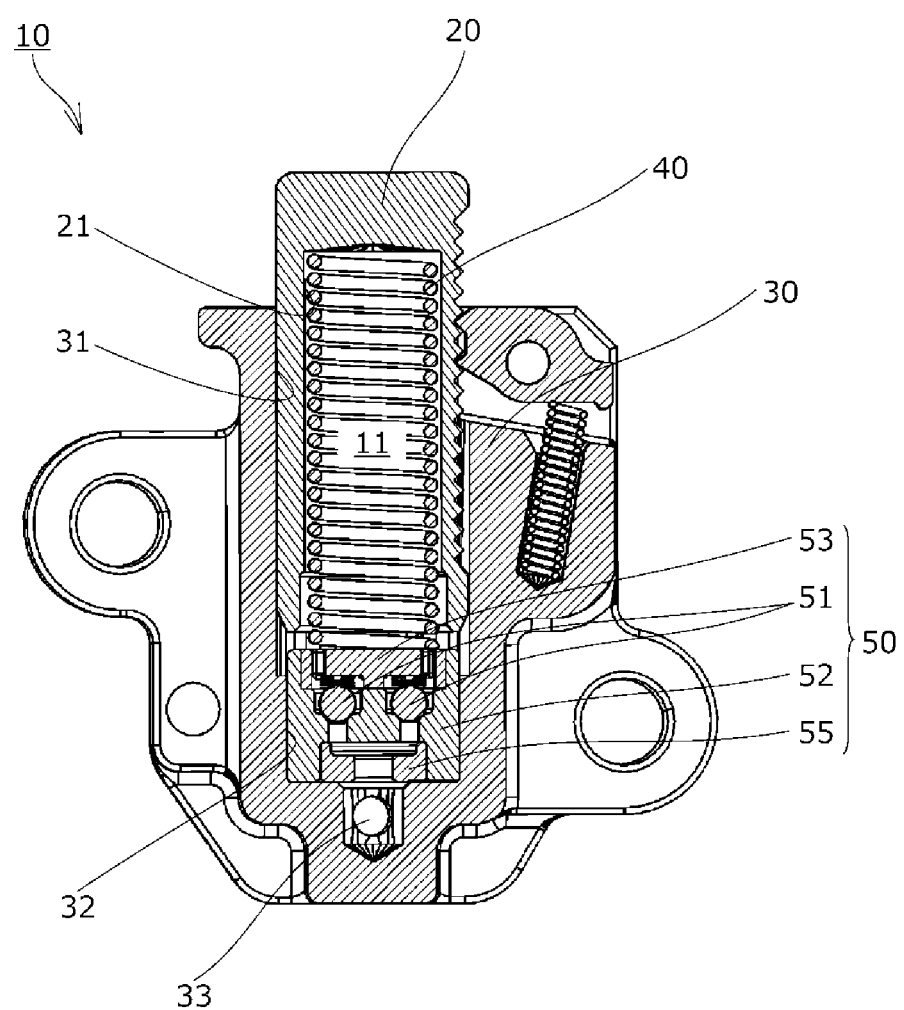
FIG. 2 is a cross-sectional view illustrating the tensioner of the first embodiment.

The tensioner 10 includes, as shown in FIG. 2, a plunger 20 having a plunger hole 21 that is open on a rear side, a housing 30 having a plunger bore 31 for accommodating the plunger 20, a coil spring 40 serving as a biasing unit that is accommodated inside an oil pressure chamber 11 formed between the plunger bore 31 and the rear end of the plunger 20 such as to be able to freely expand and contract and that biases the plunger 20 toward a front side, an oil supply passage for supplying oil from outside the housing 30 into the oil pressure chamber 11, and a check valve 50 that allows the oil to flow from the oil supply passage into the oil pressure chamber 11 but prevents the oil from flowing out from the oil pressure chamber 11 to the oil supply passage.

Hereinafter, various constituent elements of the tensioner 10 will be described with reference to the drawings.

The plunger 20 is made of metal such as iron in the form of a cylinder with a bottom and inserted in the plunger bore 31 such as to be able to move back and forth in the front to back direction, as shown in FIG. 2.

The housing 30 is made of aluminum alloy, synthetic resin or the like, and includes, as shown in FIG. 2, the cylindrical plunger bore 31 that is open on the front side, a cylindrical valve accommodating hole 32 formed continuously on the rear side of the plunger bore 31 and having a smaller diameter than that of the plunger bore 31, and a housing hole 33 that extends through a bottom part on the rear side of the housing 30 to connect the outside of the housing 30 with the plunger bore 31 (and valve accommodating hole 32).

This housing hole 33 functions as an oil supply passage for supplying oil from the outside of the housing 30 into the oil pressure chamber 11.

The coil spring 40 has one end abutting on the bottom of the plunger hole 21 (front side portion of the plunger 20) and the other end arranged in contact with a check valve 50 (retainer 53) as shown in FIG. 2.

Figure 3:
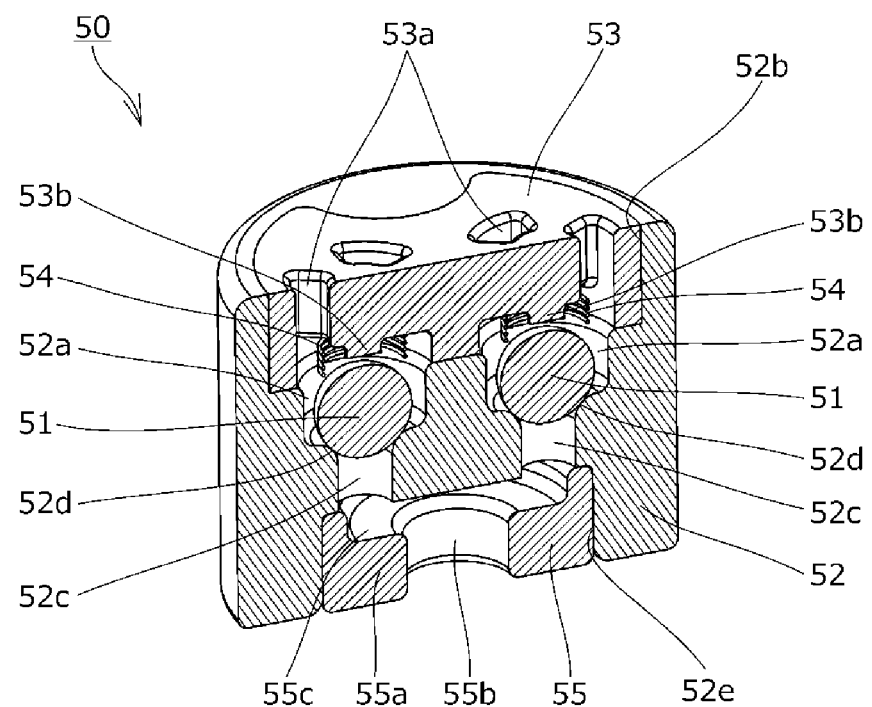
FIG. 3 is a cross-sectional perspective view illustrating a check valve of the first embodiment.
Figure 4:
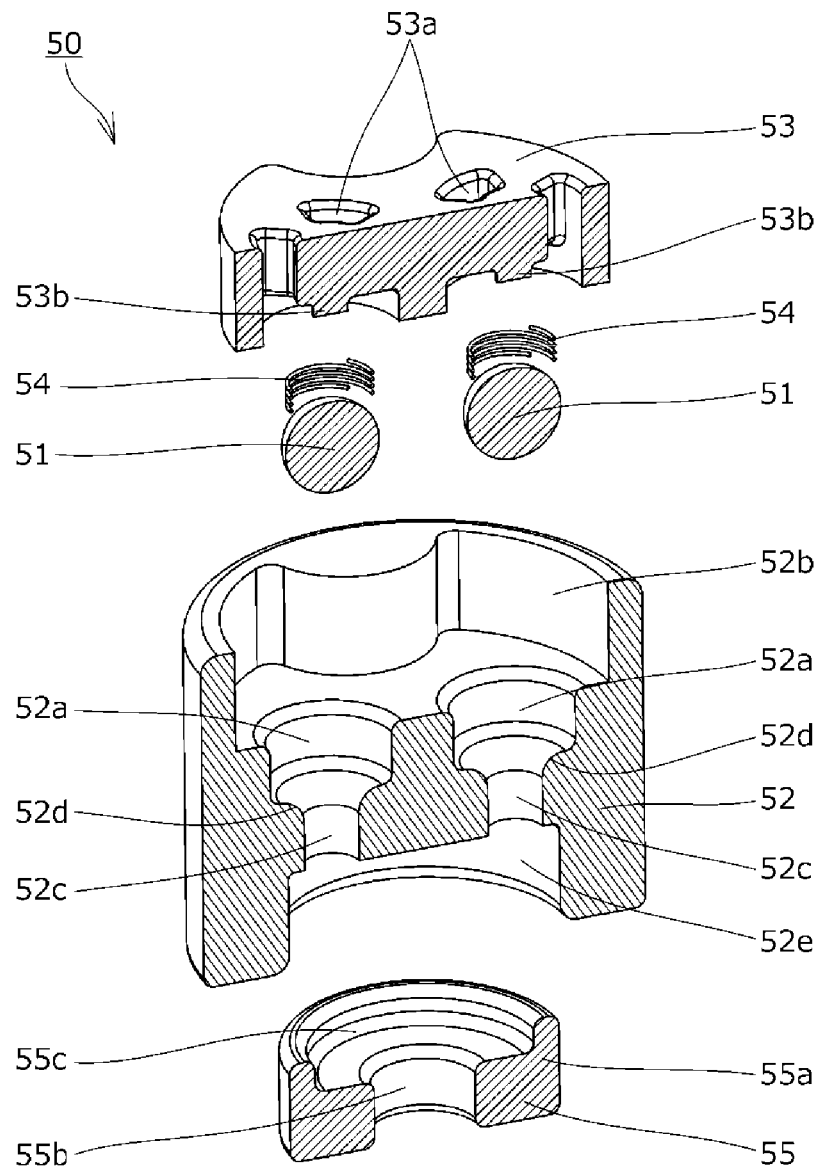
FIG. 4 is a cross-sectional perspective diagram illustrating the check valve of FIG. 3 in an exploded view.

The check valve 50 is disposed in the valve accommodating hole 32, and configured by, as shown in FIG. 2 to FIG. 4, ball-like valve members 51, a ball seat member 52, a retainer 53 that restricts the movement of the valve members 51, springs 54 interposed between the valve members 51 and the retainer 53, and a passage forming member 55.

The check valve 50 is configured such that all the components 51 to 55 described above are assembled together so that it can be handled as one unit. These components of the check valve 50 are made of metal, synthetic resin, or the like.

As shown in FIG. 3, each valve member 51 sits on a seat part 52d of the ball seat member 52 to be described later and is disposed in each valve accommodating part 52a of the ball seat member 52.

The ball seat member 52 is fitted (e.g., press-fitted) into the valve accommodating hole 32 and thus fixed to the housing 30, as shown in FIG. 2. The ball seat member 52 may be fixed to the housing 30 by other means than press-fitting.

The ball seat member 52 includes, as shown in FIG. 2 to FIG. 4, the cylindrical valve accommodating part 52a open toward the oil pressure chamber 11 (front side), a retainer installation recess 52b formed in a side face of the ball seat member 52 that faces the oil pressure chamber 11 (front side), cylindrical oil passages 52c extending through in the front to back direction and having an inlet open toward the oil supply passage (housing hole 33) and an outlet open toward the oil pressure chamber 11, a plurality of seat parts 52d that allow valve members 51 to sit thereon in circular tight contact therewith at the outlets of the oil passages 52c, and a cylindrical installation recess 52e formed in a side face of the ball seat member 52 that faces the oil supply passage (housing hole 33) (rear side).

A plurality of valve members 51 (two in this embodiment) are provided, and the valve accommodating part 52a, oil passage 52c, and seat part 52d are provided in the same number (two in this embodiment) as that of the valve member 51. One valve member 51 is set in one valve accommodating part 52a. These valve members 51, valve accommodating parts 52a, oil passages 52c, and seat parts 52d should preferably be disposed at equiangular distance (180° in this embodiment) around the center axis extending in the front to back direction.

The retainer 53 is fitted (e.g., press-fitted) in the retainer installation recess 52b, as shown in FIG. 3 or FIG. 4. The retainer 53 has a plurality of oil holes 53a that extend through in the front to back direction, and spring support parts 53b that protrude from the rear face of a top plate of the retainer 53 toward the rear side.

The springs 54 are arranged to fit around the spring support parts 53b as shown in FIG. 3 and FIG. 4 and bias the valve members 51 toward the seat parts 52d.

The passage forming member 55 is disposed inside the installation recess 52e of the ball seat member 52 and includes, as shown in FIG. 3 and FIG. 4, a cylindrical main body 55a, an oil inlet 55b formed on the oil supply passage (housing hole 33) side (rear side) of the main body 55a, and a distribution space 55c formed on the oil pressure chamber 11 side (front side) of the main body 55a.

The oil inlet 55b and distribution space 55c are formed adjacent to each other in the front to back direction and in a central part of the main body 55a, and positioned between the oil passages 52c and the oil supply passage (housing hole 33).

The oil inlet 55b opens toward the oil supply passage (housing hole 33) (rear side), while the distribution space 55c opens toward the oil pressure chamber 11 (front side) of the main body 55a.

The oil inlet 55b has an inner diameter smaller than that of the distribution space 55c. The "inner diameter" herein refers to the distance of the maximum diameter.

In the tensioner 10 of the first embodiment thus obtained, oil that is supplied from outside the housing 30 through the oil supply passage (housing hole 33) is fed into the oil pressure chamber 11 through the oil inlet 55b and distribution space 55c of the passage forming member 55, the plurality of oil passages 52c and valve accommodating parts 52a of the ball seat member 52, and the oil holes 53a of the retainer 53.

Next, a variation example of the valve members 51 of the check valve 50 will be described with reference to FIG. 5. This variation example is exactly the same as the previously described first embodiment except for some parts. Therefore, the configuration will not be described again except for different features.

Figure 5:
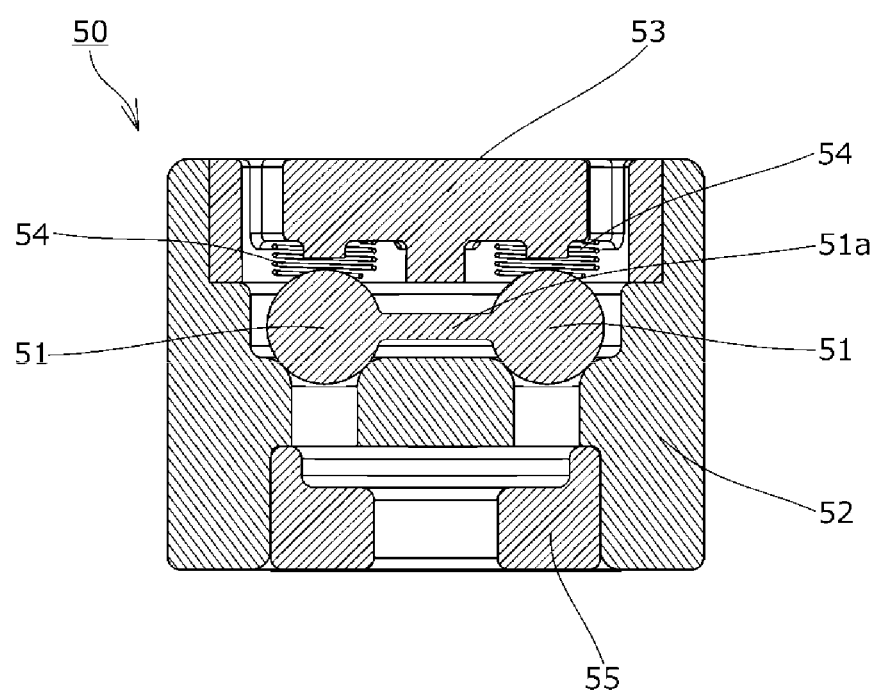
FIG. 5 is a cross-sectional view illustrating a variation example of the check valve.

In the variation example shown in FIG. 5, a connecting part 51a is provided between the plurality of (two in this variation example) valve members 51 to connect them. The connecting part 51a may be formed integral with the valve members 51, or separately from the valve members 51. The connecting part 51a is not limited to the one shown in FIG. 5 and may have other specific forms as long as it connects the plurality of valve members 51.

Next, a tensioner 10 according to a second embodiment of the present invention will be described with reference to FIG. 6. The second embodiment is, in part, exactly the same as the previously described first embodiment. Therefore, the configuration will not be described again except for different features.

Figure 6:
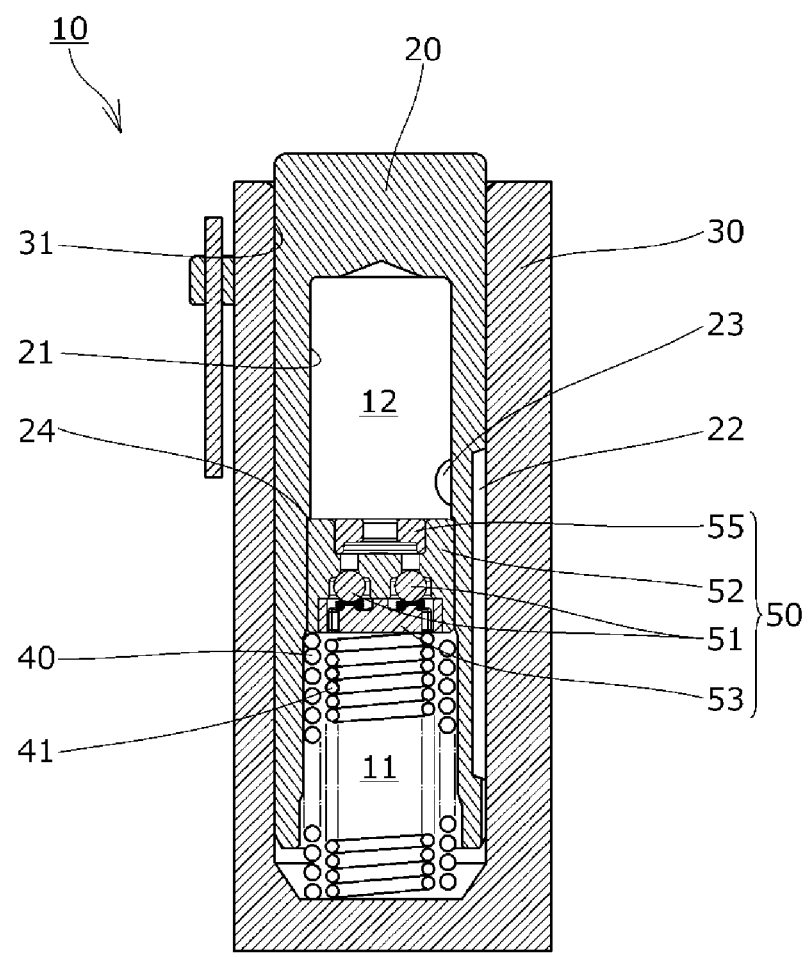
FIG. 6 is a cross-sectional view illustrating a tensioner according to a second embodiment.

In the tensioner 10 of the second embodiment, as shown in FIG. 6, the check valve 50 is installed inside the plunger hole 21. Therefore, the internal space formed between the housing 30 and the plunger 20 is divided into the oil pressure chamber 11 on the rear side and an oil reservoir chamber 12 on the front side.

The plunger 20 includes a connection/adjustment groove 22 formed in an outer circumferential surface thereof, and a plunger oil supply hole 23 for supplying oil from the connection/adjustment groove 22 into the oil reservoir chamber 12. The housing 30 includes a housing oil supply hole (not shown) extending through the outer wall of the housing 30 to the valve accommodating hole 32 for supplying oil to the connection/adjustment groove 22.

These oil reservoir chamber 12, connection/adjustment groove 22, plunger oil supply hole 23, and housing oil supply hole (not shown) function as an oil supply passage that supplies oil from outside the housing 30 into the oil pressure chamber 11.

The connection/adjustment groove 22 may be formed at least in one of the outer circumferential surface of the plunger 20 and an inner circumferential surface of the plunger bore 31.

Moreover, in the tensioner 10 of the second embodiment, as shown in FIG. 6, an inner spring 41 making contact with and pressing the retainer 53 toward the ball seat member 52 is installed radially inside the coil spring 40. The inner spring 41 has one end in contact with the retainer 53 and the other end in contact with the bottom of the plunger bore 31.

In the tensioner 10 of the second embodiment, as shown in FIG. 6, a step 24 is formed in an inner wall portion of the plunger hole 21, and this step 24 restricts the movement of the ball seat member 52 toward the front side. With this step 24, the check valve 50 is prevented from moving toward the front side due to the biasing forces of the coil spring 40 and inner spring 41.

In the tensioner 10 of the second embodiment, the check valve 50 is oriented oppositely from the first embodiment. Namely, the check valve 50 is set in the plunger hole 21 such that the retainer 53 faces the rear side and the passage forming member 55 faces the front side. In the second embodiment, the ball seat member 52 is fixed to the plunger 20 (plunger hole 21).

Next, a tensioner 10 according to a third embodiment of the present invention will be described with reference to FIG. 7 to FIG. 9A and FIG. 9B. The third embodiment is, in part, exactly the same as the previously described first embodiment. Therefore, the configuration will not be described again except for different features.

In the tensioner 10 of the third embodiment, the check valve 50 is provided with an oil pressure relief function.

Figure 7:
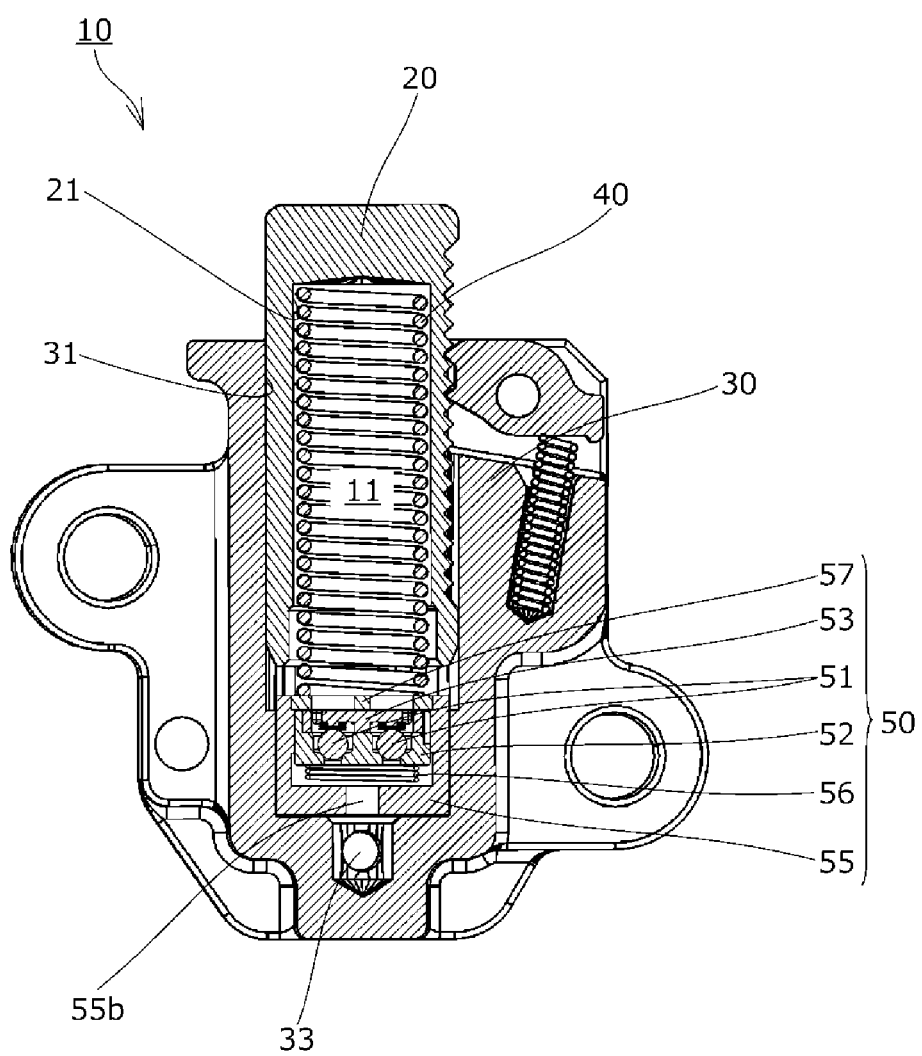
FIG. 7 is a cross-sectional view illustrating a tensioner according to a third embodiment.
Figure 8:
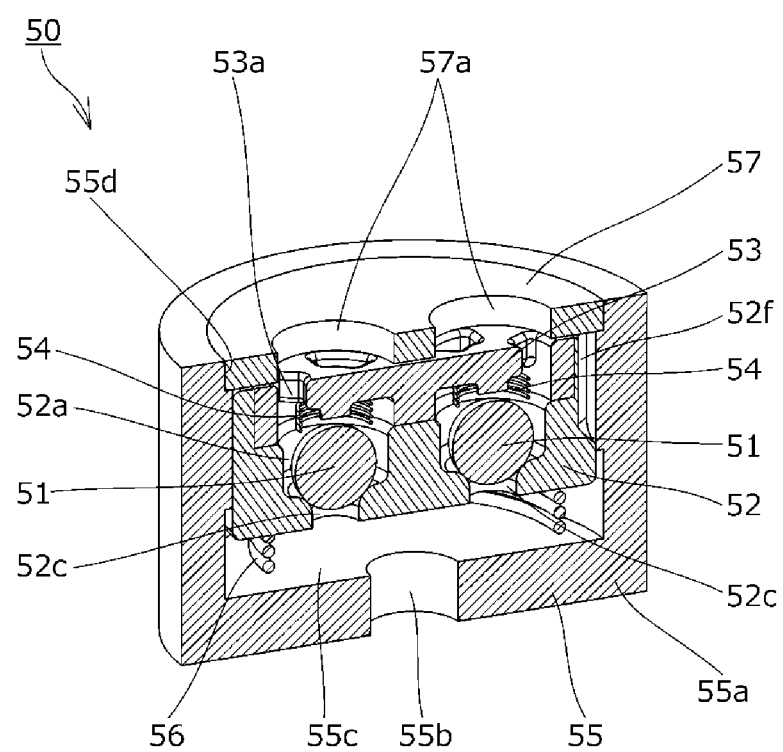
FIG. 8 is a cross-sectional perspective view illustrating a check valve of the third embodiment.

The check valve 50 includes, as shown in FIG. 7 and FIG. 8, ball-like valve members 51, a ball seat member 52, a retainer 53 that restricts the movement of the valve members 51, springs 54 disposed between the valve members 51 and the retainer 53, a passage forming member 55 in the form of a casing that accommodates the ball seat member 52 such as to be movable in the front to back direction, a seat spring 56 serving as a seat biasing unit for biasing the ball seat member 52 toward the oil pressure chamber 11, and a holding member 57 that restricts the movement of the ball seat member 52 inside the passage forming member 55.

In the third embodiment, too, the check valve 50 is configured such that all the components 51 to 57 described above are assembled together so that it can be handled as one unit. These components of the check valve 50 are made of metal, synthetic resin, or the like.

The structures of the valve members 51, retainer 53, and springs 54 are basically the same as those of the first embodiment and will not be described again.

The ball seat member 52 is different from that of the first embodiment. It does not include the installation recess 52*e* in which the passage forming member 55 is installed, and it is not directly fixed to the housing 30. A relief groove 52*f* that functions as a relief passage to be described later is formed in an outer circumferential wall of the ball seat member 52.

The structure of the ball seat member 52 in other respects is basically the same as that of the first embodiment and will not be described again.

The passage forming member 55 includes, as shown in FIG. 8, a substantially cylindrical main body 55*a* open toward the oil pressure chamber 11 and having a bottom, an oil inlet 55*b* formed in the bottom part of the main body 55*a*, a distribution space 55*c* formed on the oil pressure chamber 11 side of the oil inlet 55*b*, and an installation recess 55*d* formed at one end of the main body 55*a* on the oil pressure chamber 11 side.

The oil inlet 55*b* and distribution space 55*c* are formed continuous with each other in the front to back direction, and positioned between the oil passages 52*c* and the oil supply passage (housing hole 33).

The oil inlet 55*b* has an inner diameter smaller than that of the distribution space 55*c*.

The seat spring 56 is set in the distribution space 55*c* between the bottom part of the main body 55*a* of the passage forming member 55 and the ball seat member 52. The holding member 57 is disposed inside the installation recess 55*d* and has a plurality of oil holes 57*a* extending through in the front to back direction.

In the tensioner 10 of the third embodiment thus obtained, oil that is supplied from outside the housing 30 through the oil supply passage (housing hole 33) is fed into the oil pressure chamber 11 through the oil inlet 55*b* and distribution space 55*c* of the passage forming member 55, the plurality of oil passages 52*c* and valve accommodating parts 52*a* of the ball seat member 52, the oil holes 53*a* of the retainer 53, and the oil holes 57*a* of the holding member 57.

Figure 9A:
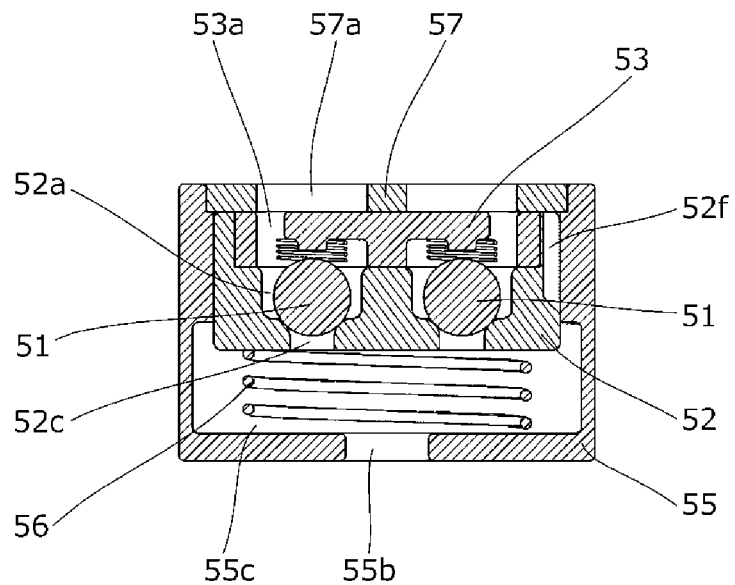
FIG. 9A is a diagram explaining the operation of the check valve of the third embodiment.
Figure 9B:
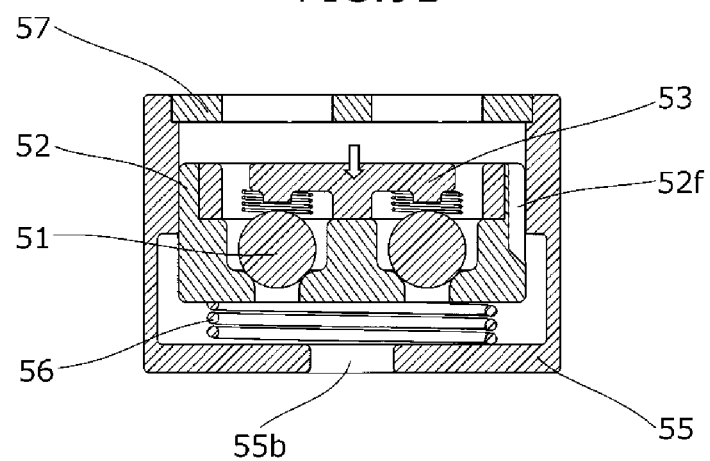
FIG. 9B is a diagram explaining the operation of the check valve of the third embodiment.
Figure 10:
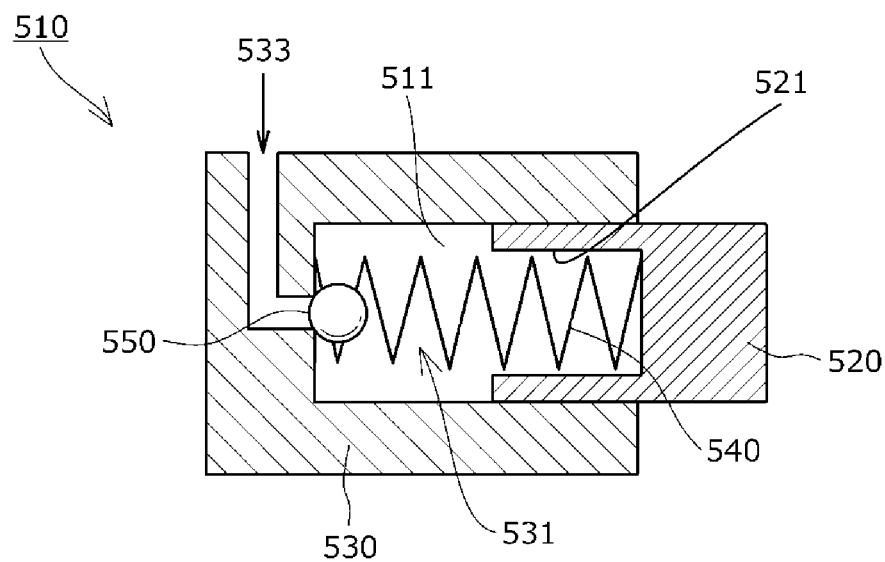
FIG. 10 is a cross-sectional view schematically illustrating a conventional tensioner.

In the tensioner 10 of the third embodiment, when the oil pressure inside the oil pressure chamber 11 rises, the ball seat member 52 and others move toward the oil supply passage (housing hole 33) (downward) as shown in FIG. 9A and FIG. 9B so that the oil inside the oil pressure chamber 11 is released through the relief groove 52*f* of the ball seat member 52 to the oil supply passage (housing hole 33).

The relief groove 52*f* of the ball seat member 52 functions as a relief passage in this way, which connects the oil pressure chamber 11 with the oil supply passage (housing hole 33) when the ball seat member 52 moves toward the oil supply passage (housing hole 33), and is closed when the ball seat member 52 moves toward the oil pressure chamber 11.

The relief passage is not limited to the one described above, and may have other specific forms as long as it connects the oil pressure chamber 11 with the oil supply passage (housing hole 33) when the ball seat member 52 moves toward the oil supply passage (housing hole 33). It may be, for example, a groove formed in the inner circumferential surface of the main body 55*a* of the passage forming member 55.

While embodiments of the present invention have been described in detail, the present invention is not limited to the above-described embodiments and may be carried out with various design changes without departing from the scope of the present invention set forth in the claims.

For example, various configurations of the embodiments described above may be freely combined to form other tensioners. For example, the valve member of the variation example shown in FIG. 5 may be assembled into the tensioner of the second or third embodiment. The check valve of the third embodiment may be assembled to the tensioner of the second embodiment.

While the tensioner was described as a component to be incorporated in a timing system of a car engine in the embodiments above, the purpose of use of the tensioner is not limited to this specific application.

Also, while the tensioner was described as a component that applies tension to a drive chain with a tensioner lever in the embodiments above, the plunger can directly guide the drive chain slidably with a distal end thereof to apply tension to the drive chain.

The tensioner may not necessarily be applied to a transmission mechanism with a drive chain but can also be used for similar transmission mechanisms that use belts, ropes and the like, and can be applied in a variety of industrial fields where it is required to apply tension to an elongated component.

While the housing accommodating the plunger is described as the component known as a housing that is attached to an engine block or the like in the embodiments described above, the housing is not limited to the specific form described above and may be a cylindrical component known as a sleeve inserted into a body hole formed in the housing.

While the retainer is fitted into the retainer installation recess formed in a side face of the ball seat member that faces the oil pressure chamber in the embodiments described above, installation of the retainer is not limited to the manner described above, and the retainer may simply be installed inside the retainer installation recess when, for example, an inner spring is provided. Similarly, the passage forming member may be simply placed inside the installation recess.

While the ball seat member is in the form of a casing that accommodates the valve members in the embodiments described above, the retainer may be formed as a casing for accommodating the valve members, and the ball seat member with seat parts may be attached to the retainer.

While springs are used for biasing the valve members toward the seat parts in the embodiments and variation examples described above, the springs are not an essential component and may be omitted depending on the form of embodiment.

While two each valve members (and valve accommodating parts, oil passages, and seat parts) are provided in the embodiments and variation examples described above, there may be three or more valve members (and valve accommodating parts, oil passages, and seat parts).

What is claimed is:

1. A tensioner comprising:
   a plunger having a plunger hole that is open on a rear side;
   a housing having a plunger bore that is open on a front side and accommodates the plunger;
   a biasing unit that is accommodated inside an oil pressure chamber formed between the plunger bore and a rear end of the plunger such as to be able to freely expand and contract and that biases the plunger toward the front side;
   an oil supply passage for supplying oil from outside the housing into the oil pressure chamber; and
   a check valve that allows oil to flow from the oil supply passage into the oil pressure chamber and prevents the oil from flowing out from the oil pressure chamber to the oil supply passage,
   the check valve including a plurality of valve members and a ball seat member,
   the ball seat member including a plurality of oil passages each having an inlet open toward the oil supply passage and an outlet open toward the oil pressure chamber, and a plurality of seat parts allowing the respective valve members to sit thereon at the respective outlets of the oil passages,
   the oil passages and the seat parts being provided in the same number as the number of the valve members, and
   the check valve further including a passage forming member having an oil inlet disposed between the plurality of oil passages and the oil supply passage,
   wherein the passage forming member is detachable from the ball seat member,
   wherein the passage forming member has a distribution space for distributing oil flowing in from the oil inlet to the plurality of oil passages, the distribution space being formed adjacent to the oil inlet on the oil pressure chamber side, and
   wherein the oil inlet has an inner diameter smaller than an inner diameter of the distribution space.

2. The tensioner according to claim 1, wherein a connecting part for connecting the plurality of valve members is provided between the plurality of valve members.

3. The tensioner according to claim 1, wherein the ball seat member is fixed to the housing or to the plunger, and
   an installation recess in which the passage forming member is installed is formed in a side face of the ball seat member that faces the oil supply passage.

4. The tensioner according to claim 1, wherein the passage forming member is formed to accommodate the ball seat member such as to be movable in a front to back direction,
   the check valve includes a seat biasing unit that biases the ball seat member toward the oil pressure chamber, and a relief passage,
   the relief passage is formed such as to connect the oil pressure chamber and the oil supply passage when the ball seat member moves toward the oil supply passage, and to be closed when the ball seat member moves toward the oil pressure chamber.

5. The tensioner according to claim 1, wherein the check valve further includes a retainer that restricts movement of the valve members,
   the ball seat member is fixed to the housing or to the plunger, and
   a retainer installation recess in which the retainer is installed is formed in a side face of the ball seat member that faces the oil pressure chamber.

6. The tensioner according to claim 1, wherein a housing hole for connecting outside of the housing with the plunger bore is formed in a bottom part on a rear side of the housing, and
   the oil supply passage is comprises the housing hole.

7. The tensioner according to claim 1, wherein the check valve is installed inside the plunger hole and divides an internal space formed between the housing and the plunger into the oil pressure chamber and an oil reservoir chamber,
   a connection/adjustment groove is formed at least in one of an outer circumferential surface of the plunger and an inner circumferential surface of the plunger bore,
   a housing oil supply hole for supplying oil to the connection/adjustment groove is formed in the housing,
   a plunger oil supply hole for supplying oil from the connection/adjustment groove into the oil reservoir chamber is formed in the plunger, and
   the oil supply passage is configured by the oil reservoir chamber, the connection/adjustment groove, the housing oil supply hole, and the plunger oil supply hole.

* * * * *